US010803423B2

(12) United States Patent
Baker, Sr.

(10) Patent No.: US 10,803,423 B2
(45) Date of Patent: Oct. 13, 2020

(54) SYSTEM FOR MANAGING PARKING OF AUTONOMOUS DRIVING VEHICLES

(71) Applicant: The Parking Genius, Inc, Dallas, TX (US)

(72) Inventor: George Frederick Baker, Sr., Dallas, TX (US)

(73) Assignee: The Parking Genius, Inc., Dallas, TX (US)

( * ) Notice: Subject to any disclaimer, the term of this patent is extended or adjusted under 35 U.S.C. 154(b) by 184 days.

(21) Appl. No.: 15/280,790

(22) Filed: Sep. 29, 2016

(65) Prior Publication Data
US 2018/0089631 A1 Mar. 29, 2018

(51) Int. Cl.
*G06Q 10/10* (2012.01)
*H04L 29/06* (2006.01)
(Continued)

(52) U.S. Cl.
CPC ....... *G06Q 10/1093* (2013.01); *G06Q 10/087* (2013.01); *H04L 67/02* (2013.01);
(Continued)

(58) Field of Classification Search
CPC .... G06Q 10/1093; G06Q 10/02; G07B 15/02; G08G 1/14; G01C 21/34; G01C 21/3407;
(Continued)

(56) References Cited

U.S. PATENT DOCUMENTS 3,105,221 A    9/1963    Schwarz
3,541,308 A    11/1970    Ruby
(Continued)

FOREIGN PATENT DOCUMENTS

DE    10 2005 040 983 A1    8/2006
DE    10 2014 221 751 A1    4/2016
(Continued)

OTHER PUBLICATIONS

Brian Cooksey Chapter 2: Protocols Published Date: Apr. 22, 2014 https://zapier.com/learn/apis/chapter-2-protocols/ (Year: 2014).*
(Continued)

*Primary Examiner* — Mehmet Yesildag
*Assistant Examiner* — Michael R Koester
(74) *Attorney, Agent, or Firm* — Foley & Lardner LLP

(57) ABSTRACT

A vehicle sensing system includes a vehicle sensing device configured to detect entry of a vehicle into a given area, and in response, to send to the vehicle an instruction message. At least one beacon device is disposed somewhere between a location of entry of the vehicle into the given area and an available parking space. A parking server communicates with the vehicle based on the instruction message, and sends parking instructions to the vehicle, the parking instructions instructing the vehicle to autonomously drive toward the available parking space, and informing the vehicle of expected interactions with the beacon device as it autonomously drives toward the available parking space. The beacon device performs the expected interactions with the vehicle if the vehicle is driving on a proper path toward the available parking space, with the proper path including the vehicle autonomously driving within wireless communication range of the beacon device.

28 Claims, 8 Drawing Sheets

(51) Int. Cl.
*H04L 29/08* (2006.01)
*G06Q 10/08* (2012.01)
*H04W 4/44* (2018.01)
*H04W 4/80* (2018.01)

(52) U.S. Cl.
CPC .............. *H04L 67/12* (2013.01); *H04L 67/42* (2013.01); *H04W 4/44* (2018.02); *H04W 4/80* (2018.02)

(58) Field of Classification Search
CPC ... G01C 21/00; G07C 9/00158; B60W 30/06; B60R 16/037
See application file for complete search history.

(56) References Cited

U.S. PATENT DOCUMENTS

| | | | |
|---|---|---|---|
| 4,239,415 | A | 12/1980 | Blikken |
| 5,331,276 | A | 7/1994 | Polvani et al. |
| 5,491,475 | A | 2/1996 | Rouse et al. |
| 5,621,314 | A | 4/1997 | Beck et al. |
| 5,648,904 | A | 7/1997 | Scott |
| 5,880,682 | A | 3/1999 | Soulliard et al. |
| 6,195,020 | B1 | 2/2001 | Brodeur et al. |
| 6,675,123 | B1 | 1/2004 | Edelstein |
| 6,865,455 | B1 | 3/2005 | Wiegert |
| 8,056,667 | B2 | 11/2011 | Moshchuk et al. |
| 8,099,214 | B2 | 1/2012 | Moshchuk et al. |
| 8,977,652 | B2 | 3/2015 | Hoefner et al. |
| 9,311,816 | B2 | 4/2016 | Engler et al. |
| 9,408,041 | B1 | 8/2016 | Abehassera et al. |
| 9,696,721 | B1 | 7/2017 | Myers et al. |
| 10,135,440 | B2 | 11/2018 | Taylor et al. |
| 2001/0027360 | A1 | 10/2001 | Nakano et al. |
| 2002/0190856 | A1 | 12/2002 | Howard |
| 2004/0012481 | A1 | 1/2004 | Brusseaux |
| 2004/0222903 | A1* | 11/2004 | Li .................. G08G 1/14 340/932.2 |
| 2005/0046598 | A1 | 3/2005 | Allen et al. |
| 2005/0280555 | A1* | 12/2005 | Warner, IV .......... G08G 1/14 340/932.2 |
| 2007/0015485 | A1 | 1/2007 | Debiasio et al. |
| 2007/0050240 | A1 | 3/2007 | Belani et al. |
| 2007/0129974 | A1 | 6/2007 | Chen et al. |
| 2007/0162218 | A1 | 7/2007 | Cattin et al. |
| 2007/0245158 | A1 | 10/2007 | Giobbi et al. |
| 2008/0153515 | A1* | 6/2008 | Mock ............... G01C 21/20 455/456.5 |
| 2010/0026521 | A1 | 2/2010 | Noel, II |
| 2011/0048103 | A1 | 3/2011 | Su et al. |
| 2011/0057815 | A1 | 3/2011 | King et al. |
| 2011/0099126 | A1 | 4/2011 | Belani et al. |
| 2011/0137773 | A1 | 6/2011 | Davis et al. |
| 2011/0172909 | A1 | 7/2011 | Kahn et al. |
| 2011/0213672 | A1 | 9/2011 | Redmann et al. |
| 2012/0056758 | A1 | 3/2012 | Kuhlman et al. |
| 2012/0092190 | A1 | 4/2012 | Stefik et al. |
| 2012/0095791 | A1 | 4/2012 | Stefik et al. |
| 2012/0109760 | A1 | 5/2012 | Koiso |
| 2012/0182160 | A1 | 7/2012 | Hod |
| 2012/0246079 | A1 | 9/2012 | Wilson et al. |
| 2012/0285790 | A1 | 11/2012 | Jones et al. |
| 2013/0103200 | A1 | 4/2013 | Tucker et al. |
| 2013/0135118 | A1 | 5/2013 | Ricci |
| 2013/0147954 | A1 | 6/2013 | Song et al. |
| 2014/0036076 | A1 | 2/2014 | Nerayoff et al. |
| 2014/0046506 | A1 | 2/2014 | Reichel et al. |
| 2014/0218218 | A1* | 8/2014 | Lloreda ............. G08G 1/207 340/989 |
| 2014/0232518 | A1 | 8/2014 | Stoehr |
| 2014/0232563 | A1 | 8/2014 | Engler et al. |
| 2014/0249742 | A1 | 9/2014 | Krivacic et al. |
| 2014/0350853 | A1* | 11/2014 | Proux .............. G08G 1/096741 701/533 |
| 2014/0368327 | A1 | 12/2014 | Darrer et al. |
| 2015/0016661 | A1 | 1/2015 | Lord |
| 2015/0066607 | A1 | 3/2015 | Fiorucci et al. |
| 2015/0117704 | A1 | 4/2015 | Bulan et al. |
| 2015/0138001 | A1 | 5/2015 | Davies et al. |
| 2015/0149265 | A1* | 5/2015 | Huntzicker ......... H04L 63/0823 705/13 |
| 2015/0179070 | A1 | 6/2015 | Sandbrook |
| 2015/0241241 | A1 | 8/2015 | Cudak et al. |
| 2015/0279210 | A1 | 10/2015 | Zafiroglu et al. |
| 2015/0294210 | A1 | 10/2015 | Martinez De Velasco Cortina et al. |
| 2015/0317840 | A1 | 11/2015 | Dutta et al. |
| 2015/0334678 | A1 | 11/2015 | MacGougan et al. |
| 2015/0346727 | A1 | 12/2015 | Ramanujam |
| 2015/0367234 | A1 | 12/2015 | Jones et al. |
| 2015/0369618 | A1* | 12/2015 | Barnard ................ H04W 4/40 701/491 |
| 2016/0071415 | A1 | 3/2016 | Maeda et al. |
| 2016/0104328 | A1 | 4/2016 | Chen et al. |
| 2016/0125736 | A1 | 5/2016 | Shaik |
| 2016/0189435 | A1 | 6/2016 | Beaurepaire |
| 2016/0203649 | A1* | 7/2016 | Berkobin ........... G06Q 30/0609 705/13 |
| 2016/0219012 | A1 | 7/2016 | Liao et al. |
| 2016/0275794 | A1 | 9/2016 | Chang |
| 2016/0286627 | A1 | 9/2016 | Chen et al. |
| 2016/0328961 | A1 | 11/2016 | Garces Cadenas et al. |
| 2017/0008515 | A1 | 1/2017 | Seo et al. |
| 2017/0109942 | A1 | 4/2017 | Zivkovic et al. |
| 2017/0132922 | A1 | 5/2017 | Gupta et al. |
| 2017/0140645 | A1 | 5/2017 | Balid et al. |
| 2017/0200365 | A1 | 7/2017 | Baker, Sr. |
| 2018/0061145 | A1 | 3/2018 | Blustein |
| 2018/0089631 | A1 | 3/2018 | Baker, Sr. |
| 2018/0114438 | A1 | 4/2018 | Rajagopalan et al. |
| 2018/0122152 | A1 | 5/2018 | Shin |
| 2018/0247534 | A1 | 8/2018 | Williams |
| 2019/0088119 | A1 | 3/2019 | O'Callaghan |
| 2019/0088129 | A1 | 3/2019 | O'Callaghan |

FOREIGN PATENT DOCUMENTS

| | | |
|---|---|---|
| DE | 10 2014 221 777 A1 | 4/2016 |
| DE | 10 2015 202 471 A1 | 8/2016 |
| WO | WO-2015/144396 A1 | 10/2015 |
| WO | WO-2016/130719 A2 | 8/2016 |

OTHER PUBLICATIONS

Cooksey, Brian—Chapter 2: Protocols, Published Sep. 2, 2016, [online] [retrieved Sep. 2, 2016]. Retrieved from the Internet Archive Wayback Machine <URL:https://web.archive.org/web/20160902183633/https://zapier.com/learn/apis/chapter-2-protocols/> (Year: 2016).*

Cooksey, Brian—Chapter 2: Protocols, Published Sep. 2, 2016, [online] [retrieved Sep. 2, 2016]. Retrieved from the Internet Archive Wayback Machine <URL:https://web.archive.org/web/20160902183633/https://zapier.com/learn/apis/chapter-2-protocols/> (Year: 2016).*

International Search Report and Written Opinion for corresponding International Patent Application No. PCT/US2017/053672 dated Dec. 1, 2017, 15 pages.

Ferreira, et al., Self-automated parking lots for autonomous vehicles based on vehicular ad hoc networking. IEEE Intelligent Vehicles Symposium, 472-479, 2014. [retrieved on Jun. 11, 2017.] Retrieved from the Internet, 9 pages<URL:https://pdfs.semanticsscholar.org/f23e/25d41e9dfee3ce8a0e2be372c64aa1e2c91f.pdf>.

Final Office Action on U.S. Appl. No. 14/995,157, dated Oct. 30, 2018.

Final Office Action on U.S. Appl. No. 15/711,796, dated Oct. 22, 2018.

International Preliminary Report on Patentability re PCT/US2017/012292 dated Jul. 26, 2018, 15 pages.

(56) References Cited

OTHER PUBLICATIONS

International Search Report and Written Opinion for corresponding International Patent Application No. PCT/US2017012292 dated Jul. 7, 2017, 22 pages.
International Search Report and Written Opinion dated Oct. 29, 2018 in PCT/US2018/051568; 14 pages.
International Search Report and Written Opinion dated Feb. 13, 2018 for International Patent Application No. PCT/US2017/062180, 8 pages.
Non-Final Office Action on U.S. Appl. No. 15/360,670, dated Sep. 20, 2018, 11 pgs.
Non-Final Office Action on U.S. Appl. No. 14/995,148, dated Aug. 23, 2018.
Non-Final Office Action on U.S. Appl. No. 15/711,796, dated May 17, 2018.
Non-Final Office Action on U.S. Appl. No. 15/711,897, dated Jan. 18, 2019.
Non-Final Office Action on U.S. Appl. No. 14/995,157, dated May 9, 2018, 26 pgs.
Notice of Allowance on U.S. Appl. No. 15/360,670, dated Jan. 8, 2019.
Notice of Allowance on U.S. Appl. No. 15/711,796, dated Dec. 28, 2018.
International Search Report and Written Opinion for PCT/US2018/52005 dated Jan. 29, 2019, 7 pages.
Notice of Allowance on U.S. Appl. No. 15/711,796, dated Feb. 4, 2019.
Final Office Action on U.S. Appl. No. 14/995,148, dated Mar. 12, 2019.
Non-Final Office Action on U.S. Appl. No. 14/995,157, dated Mar. 7, 2019.
Non-Final Office Action on U.S. Appl. No. 14/995,148, dated Oct. 4, 2019.
Final Office Action on U.S. Appl. No. 14/995,157, dated Nov. 25, 2019.
Non-Final Office Action on U.S. Appl. No. 16/416,662, dated Nov. 7, 2019.
International Preliminary Report on Patentability for PCT/US2017/053672 dated Apr. 11, 2019, 13 pages.
Non-Final Office Action on U.S. Appl. No. 16/442,031, dated Jul. 17, 2019.
Notice of Allowance on U.S. Appl. No. 15/711,897, dated Aug. 14, 2019.
European Search Report for EP Patent Application No. 17857317.6 dated Feb. 4, 2020.
Final Office Action on U.S. Appl. No. 14/995,148, dated Feb. 14, 2020.
Final Office Action on U.S. Appl. No. 16/442,031, dated Dec. 26, 2019.
Final Office Action on U.S. Appl. No. 16/416,662, dated Mar. 13, 2020.
Non-Final Office Action on U.S. Appl. No. 16/601,277, dated Jun. 1, 2020.
Non-Final Office Action on U.S. Appl. No. 14/995,157 dated Jul. 14, 2020.

* cited by examiner

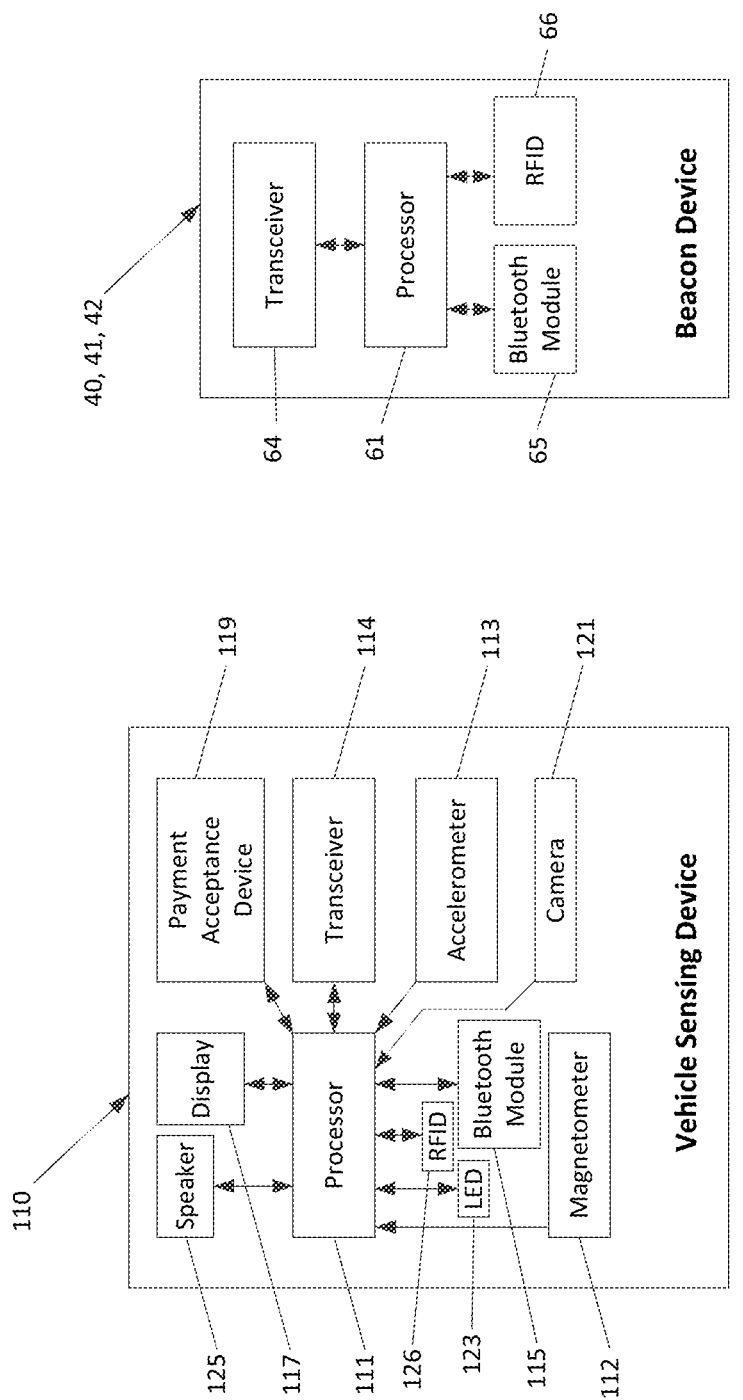

SYSTEM FOR MANAGING PARKING OF AUTONOMOUS DRIVING VEHICLES

TECHNICAL FIELD

This disclosure related to the field of parking management, and, more particularly, to systems and methods for directing autonomously driving vehicles for parking purposes.

BACKGROUND

In many cities, motor vehicles such as cars are the predominant mode of transportation utilized by residents. Increasingly, such cars are capable of autonomous driving and parking. Therefore, parking lots may now have one or more vehicles autonomously driving therein, looking for a space in which to park, typically through use of radar.

While some autonomous driving cars are certainly capable of locating and parking in a space, they may methodically accomplish this task by driving up and down rows in succession, searching for an open space. In the case where an open space is not close to the starting search point of the autonomous driving car, this may result in a longer than desirable dwell time of the autonomous driving.

In small, sparsely populated parking lots, this increased dwell time may not be an issue. However, in large crowded parking lots, such as present at athletic stadiums, concert venues, and shopping malls, this increased dwell time may negatively impact the flow of traffic in the parking lot. This is highly undesirable, as it may result in frustration of attendees, or may result in reduced parking sales in a given lot, as other parking lots farther away yet with more sparse traffic may be sought out.

Therefore, there is a commercial need for parking lot technology capable of efficiently directing autonomous driving cars toward open parking spaces or storage areas.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A vehicle sensing system described herein includes a vehicle sensing device configured to detect entry of a vehicle into a given area, and in response, to send to the vehicle an instruction message. At least one beacon device is disposed somewhere between a location of entry of the vehicle into the given area and an available parking space. A parking server communicates with the vehicle based on the instruction message, and is configured to send parking instructions to the vehicle, the parking instructions instructing the vehicle to autonomously drive toward the available parking space, and informing the vehicle of expected interactions with the at least one beacon device as it autonomously drives toward the available parking space. The at least one beacon device is configured to perform the expected interactions with the vehicle if the vehicle is driving on a proper path toward the available parking space, with the proper path including the vehicle autonomously driving within wireless communication range of the at least one beacon device.

The parking instructions sent by the parking server may instruct the vehicle to autonomously drive to a sub-area including the available parking space.

The given area may be a parking lot, and the sub-area may be a row in the parking lot.

The at least one beacon device may be a Bluetooth beacon device.

The at least one beacon device may be a plurality of beacon devices disposed along a path from the location of entry into the given area toward the available parking space.

The given area may be a parking lot including a plurality of sub-areas of parking spaces, one of which includes the available parking space, and at least some of the plurality of beacon devices may be positioned at entrances to sub-areas of the plurality of sub-areas of parking spaces.

The instruction message may instruct the vehicle to contact the parking server by executing an application programming interface (API) call. The instruction message may be an API uniform resource locater (URL).

The parking server may be configured to send updated parking instructions instructing the vehicle to autonomously drive toward a different available parking space, and informing the vehicle of expected interactions with the at least one beacon device as it autonomously drives to the different available parking space. In addition, the different available parking space may be a newly available parking space that was not known as being available at a time at which the vehicle entered into the given area. Also, the given area may be a parking lot including a plurality of sub-areas of parking spaces, one of which includes the available parking space. The at least one beacon device may be a plurality of beacon devices disposed along a path from the location of entry into the given area toward the available parking space. At least some of the plurality of beacon devices may be positioned at entrances to sub-areas of the plurality of sub-areas of parking spaces. At least one of the plurality of beacon devices may notify the parking server that the available parking space is no longer available. At least one of the plurality of beacon devices may notify the parking server that the newly available parking spot is newly available.

The at least one beacon device may be further configured to notify the parking server if at least one of the expected interactions was not performed, or if an unexpected interaction was performed, thereby indicating that the vehicle is not driving on the proper path.

The parking server may be further configured to send remedial parking instructions to the vehicle as a function of the vehicle not driving on the proper path.

The remedial parking instructions may instruct the vehicle to autonomously drive toward the available parking space, and inform the vehicle of new expected interactions with the at least one beacon device as it autonomously drives to the available parking spot.

The parking server may be further configured to notify a relevant party as a function of the vehicle not following the remedial parking instructions.

The remedial parking instructions may instruct the vehicle to autonomously drive toward a different available parking space, and inform the vehicle of new expected interactions with the at least one beacon device as it autonomously drives to the different available parking space.

The available parking spot may be at least one available parking spot in a sub-area containing the at least one available parking spot, and the parking instructions may instruct the vehicle to autonomously drive toward the sub-area containing the available parking space, and inform the vehicle of expected interactions with the at least one beacon device as it autonomously drives toward the sub-area containing the available parking spot. The at least one beacon device may be configured to perform the expected interactions with the vehicle if the vehicle is driving on a proper path toward the sub-area containing available parking space.

The parking instructions may instruct the vehicle to autonomously drive to and park in the available parking spot.

The vehicle sensing device may be further configured to determine a size and/or type of the vehicle, and to send the determined size and/or type of the vehicle to the parking server; and wherein the parking server is configured to select the available parking spot from among a plurality of available parking spots as a function of the determined sized and/or type of the vehicle.

The parking server may be configured to track inventory of parking spots.

The at least one beacon device may be configured to notify the parking server of performance of at least one expected interaction with the vehicle, and the parking server may be configured to send traffic direction commands to at least one other vehicle as a function of notification of the performance of at least one expected interaction with the vehicle.

The parking server may be configured to receive telemetry from the vehicle, and to send traffic direction commands to at least one other vehicle as a function of the received telemetry.

Autonomously driving is driving with substantially no driver input, including accelerating, braking, and turning.

The parking server may be configured to select the available parking space from among a plurality of available parking spaces as a function of information received from the vehicle. The information received from the vehicle may be schedule information associated with a user of the vehicle.

The schedule information may include at least one of a destination of the user, an estimated time the user is to spend at the destination, a profile of the user, a hotel reservation of the user, an airline ticket of the user, a bus ticket of the user, a cruise ticket of the user, a train ticket of the user, or an event ticket of the user.

In some cases, the information received from the vehicle may be user input.

BRIEF DESCRIPTION OF THE DRAWINGS

So that the manner in which the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

FIG. 2A is a block diagram of a vehicle detection device such as may be used with the systems and methods of this disclosure.

FIG. 2B is a block diagram of a beacon device such as may be used with the systems and methods of this disclosure.

DETAILED DESCRIPTION

Figure 1A:
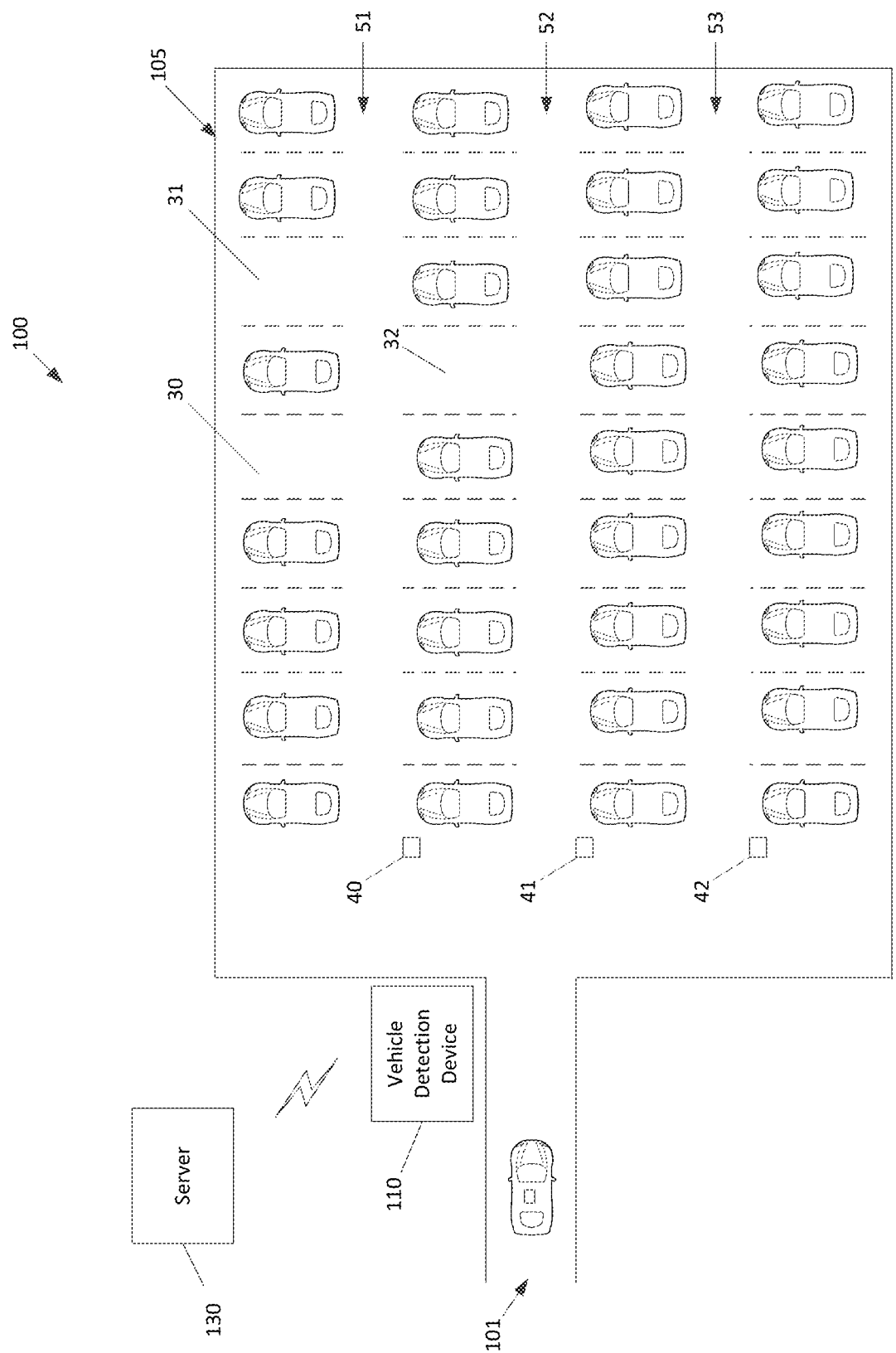
FIGS. 1A-1F are block diagrams of a system for managing traffic flow in given area or zone, in accordance with the present disclosure.

In the following description, numerous details are set forth to provide an understanding of the present disclosure.

It will be understood by those skilled in the art, however, that the embodiments of the present disclosure may be practiced without these details and that numerous variations or modifications from the described embodiments may be possible.

With initial reference to FIG. 1A, a system 100 for managing traffic flow of autonomous driving cars in a zone or given area, such as a parking lot 105 will now be described. The system 100 includes a vehicle sensing device or vehicle detection device 110 positioned at the entrance to the parking lot 105. The parking lot, zone, or given area 105 itself is divided into sub-areas, such as rows 51-53, with a respective beacon device 40-42 at the entrance to each row 51-53. The beacon device may be any device capable of any form of wireless communication, such as, but not limited to, Bluetooth.

Although a parking lot 105 divided into rows 51-53 is shown, it should be understood that the inventions, technologies, and methods disclosed herein are applicable to any given area divided into sub-areas. For example, the given area may be a city, and the sub-areas may be individual city streets. Also, the given area need not be bounded or blocked off with but one entrance and/or exit, and may have any number of entrances or exits. In addition, the term "vehicle" as used here may be any movable object, such as a car, and may or may not be configured to carry passengers or cargo.

A parking server 130 is in communication (either wired or wireless) with the vehicle detection device 110. It is to be understood that the parking server 130 may be an individual server machine, a virtual server, a cluster of server machines, or a cloud service. Thus, the term parking server is to be construed to include any address that data can be sent to and received from.

The parking server 130 cooperates with the vehicle detection device 110 for tracking inventory of available spaces in the parking lot 105. This inventory tracking is accomplished, for example, by monitoring a difference between a number of vehicles entering the parking lot 105 and vehicles leaving the parking lot 105, using the vehicle detection device 110. The beacon devices 40-42 may detect entry and exit of vehicles into the rows 51-53, perform the same sort of inventory tracking on a row by row basis, and provide the results to the vehicle detection device 110 and/or parking server 130, or may provide data to the vehicle detection device 110 and/or parking server 130 to permit the same sort of inventory tracking on a row by row basis. This way, the tracked inventory of the parking lot 105 includes information about which rows 51-53 have free spaces, and how many free spaces are in each row 51-53. This inventory may be tracked in real time and be continuously updated.

Therefore, the parking server 130 has knowledge of how many spaces are available in the parking lot 105, and in which rows 51-53 those available spaces reside. In some cases, there may be additional beacon devices 40-42 or other sensing devices within the rows 51-53 to facilitate inventory tracking on a space by space basis. Thus, in some cases, the parking server 130 has knowledge of the location of individual available spaces.

As shown in FIG. 1A, there is an available space 32 in row 52, and there are available spaces 30-31 in row 51. The vehicle 101 is a vehicle capable of autonomous driving and parking, and has yet to enter the parking lot 105.

Figure 3:
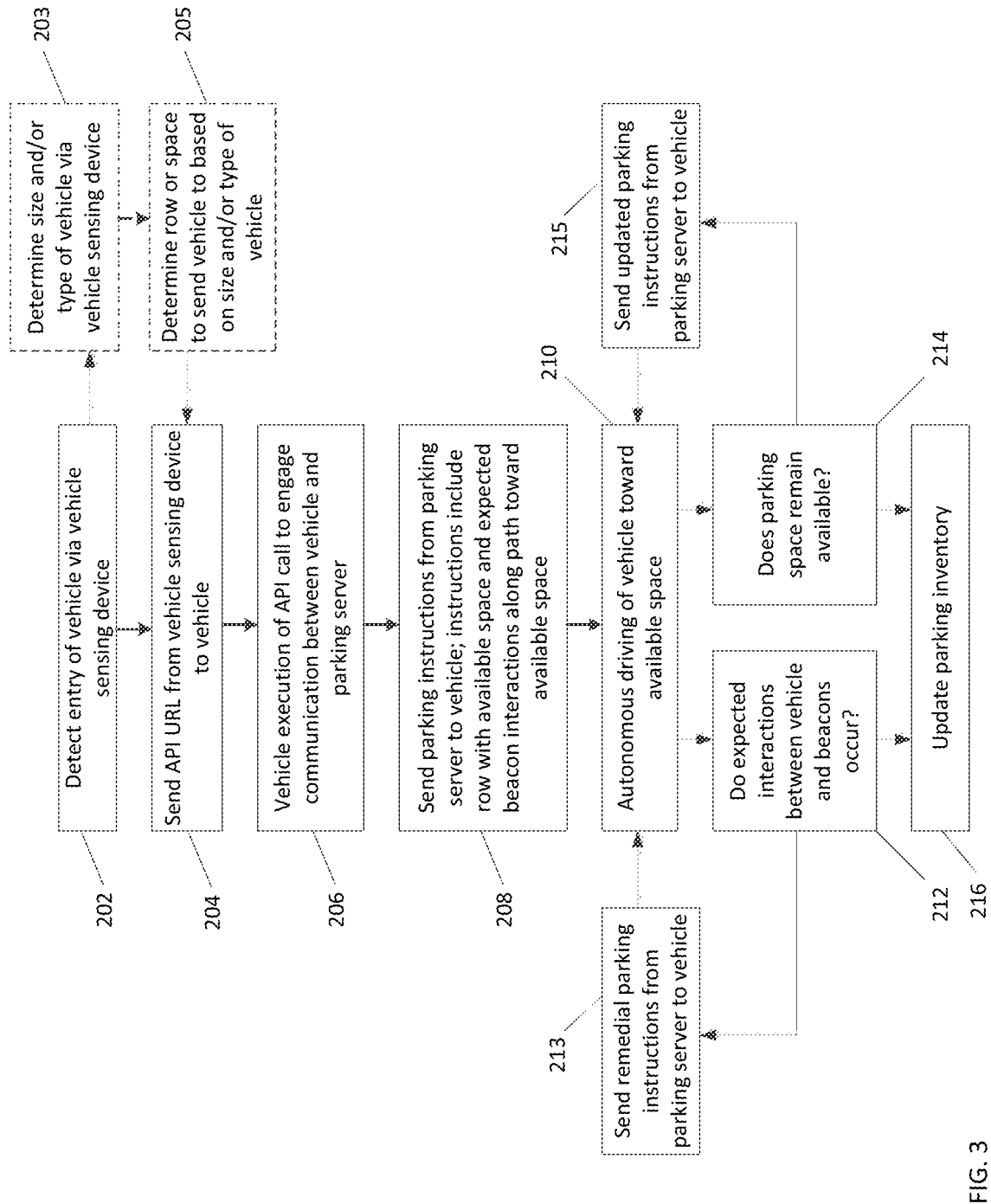
FIG. 3 is a chart showing operation of the system of this disclosure.

Operation of the system 100 for managing parking and traffic of autonomous driving vehicles 101 in the parking lot 105 is now described with further reference to FIGS. 1B-1F, and to FIG. 3. In this description, reference numerals in parentheticals and prefaced by "Step" refer to the flowchart of FIG. 3, and other reference numerals refer to items shown in FIGS. 1B-1F.

Figure 1B:
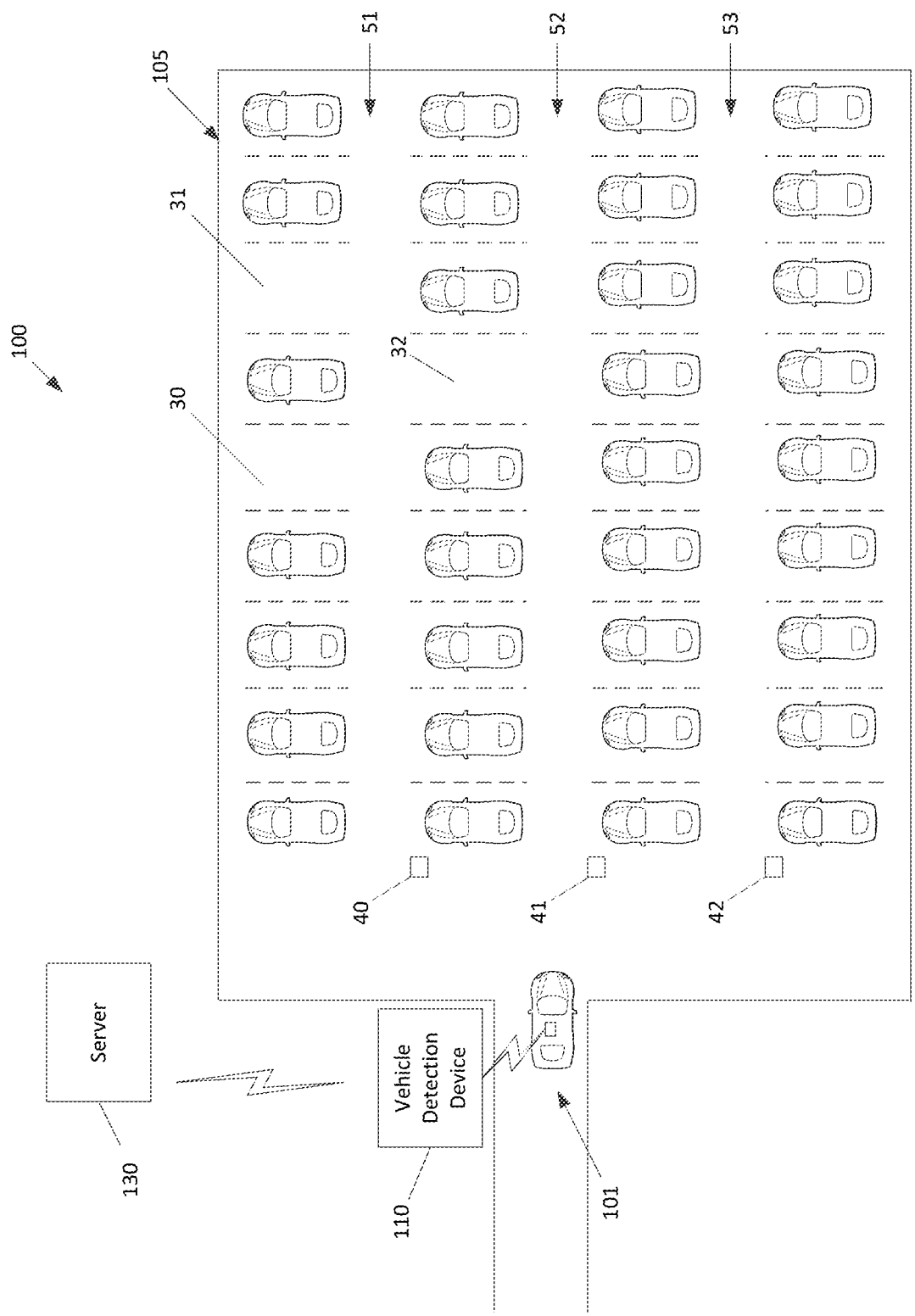

Moving to FIG. 1B, the vehicle 101 has entered the parking lot 105. As the vehicle 101 enters the parking lot 105, the vehicle detection device 110 detects entry of the vehicle (Step 202). It should be noted that the vehicle detection device 110 may optionally determine a vehicle size and/or type (Step 203) and communicate that determined vehicle size and/or type to the parking server 130, which may in turn select an individual parking space or row based upon the vehicle size and/or type (Step 205). For example, the vehicle 101 may be determined to be a small car, and a row (or space in a row) containing space(s) sufficient for compact cars but not pickup trucks may be selected.

Alternatively or additionally, the parking server 130 may select an individual parking space or row as a function of information received from the vehicle 101. This information may be user entered, such as an expected duration the vehicle 101 is to remain parked. This information may instead be schedule information associated with the user of the vehicle, which the vehicle 101 may either have stored, have received from a smartphone of the user, or may have retrieves from a cloud server or service. This schedule information may be, for example, a destination of the user, an estimated time the user is to spend at the destination, a profile of the user, a hotel reservation of the user, an airline ticket of the user, a bus ticket of the user, a cruise ticket of the user, a train ticket of the user, or an event ticket of the user.

Figure 1C:
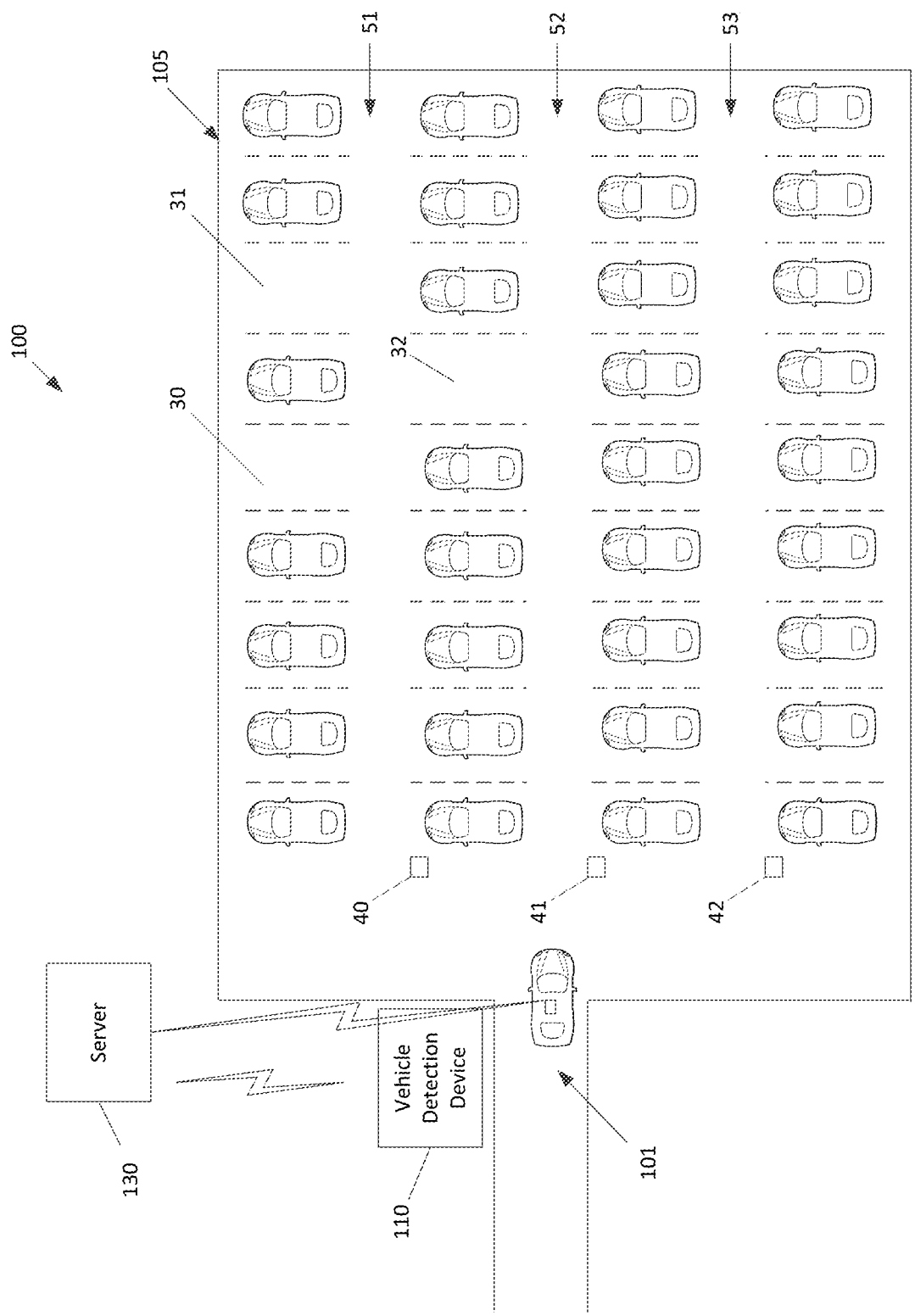

In response to detection of the vehicle 101, the vehicle detection device 110 sends an instruction message to the vehicle 101 (Step 204). The instruction message 101 may be an application protocol interface (API) uniform resource locater (URL). The vehicle 101 receives the API URL, and, as shown in FIG. 1C, based thereupon executes an API call to thereby establish communication with the parking server 130 (Step 206).

The parking server 130 then sends parking instructions to the vehicle (Step 208). The parking instructions instruct the vehicle 101 to autonomously drive toward row 51 with available spaces 30-31, and inform the vehicle 101 about which of the beacons 40-42 to expect an interaction with as it autonomously drives toward the row 51 and available spaces 30-31. The vehicle 101 then proceeds to autonomously drive toward the row 51 (Step 208), as shown in FIGS. 1D-1F.

Figure 1D:
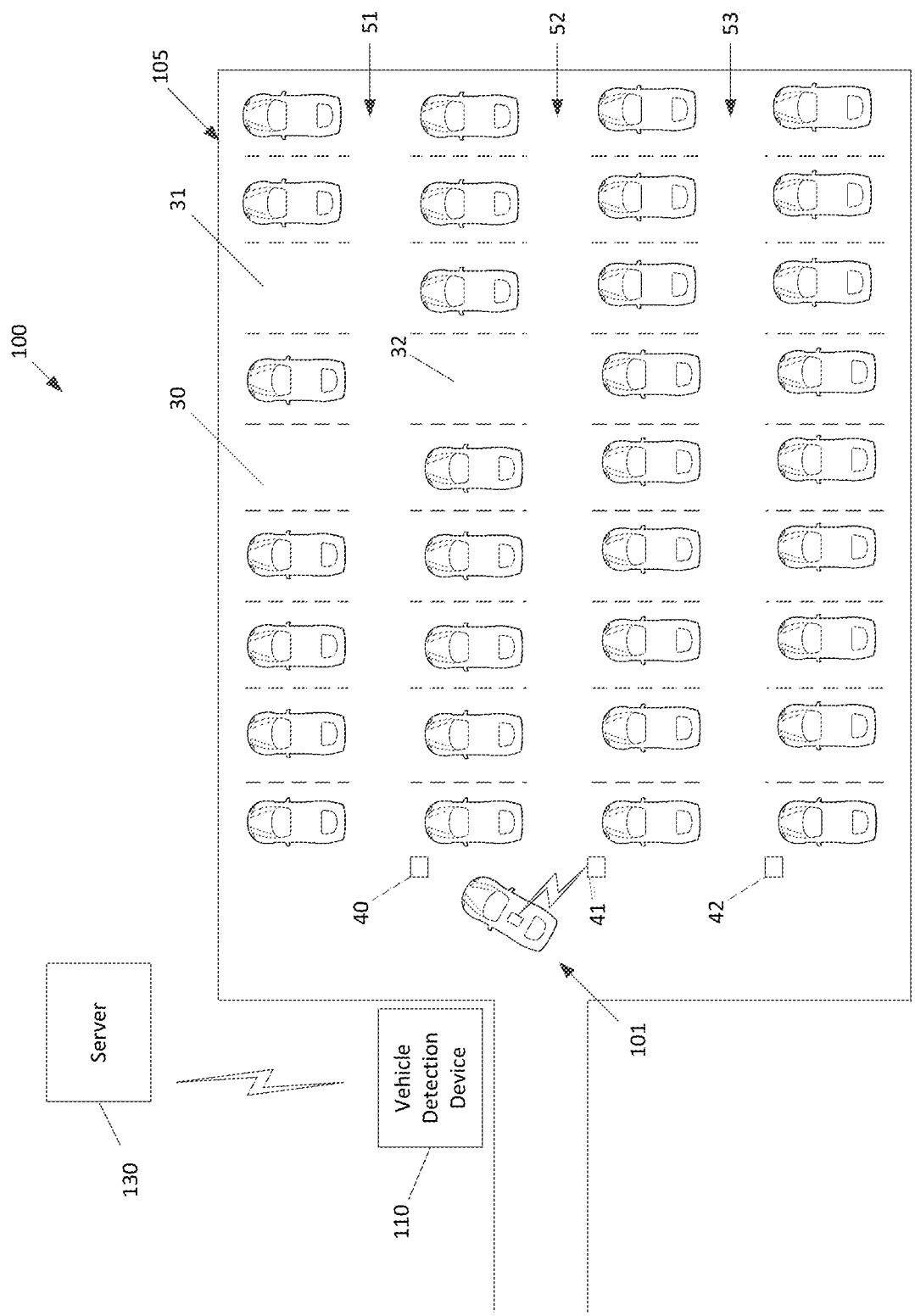
Figure 1E:
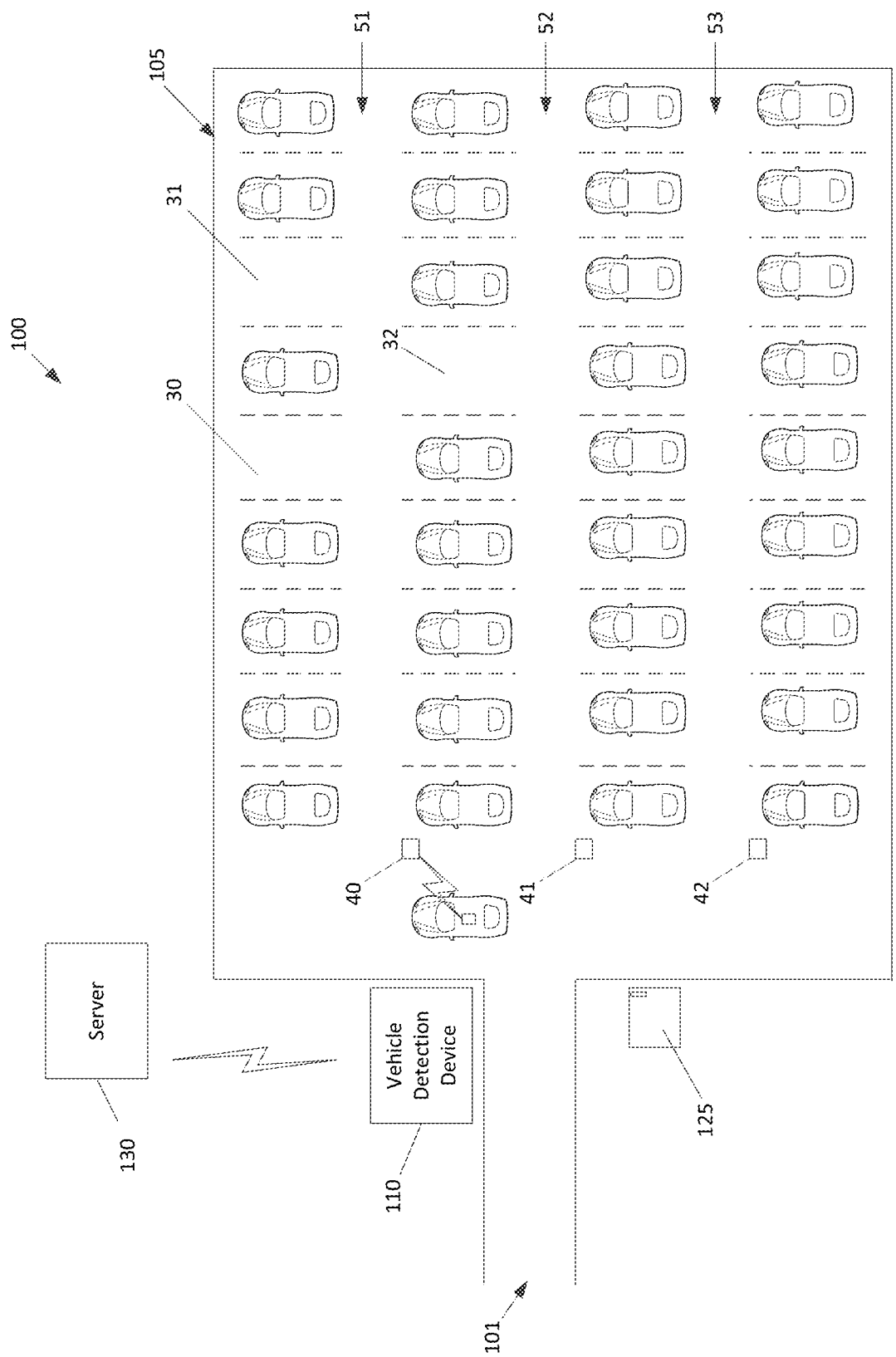
Figure 1F:
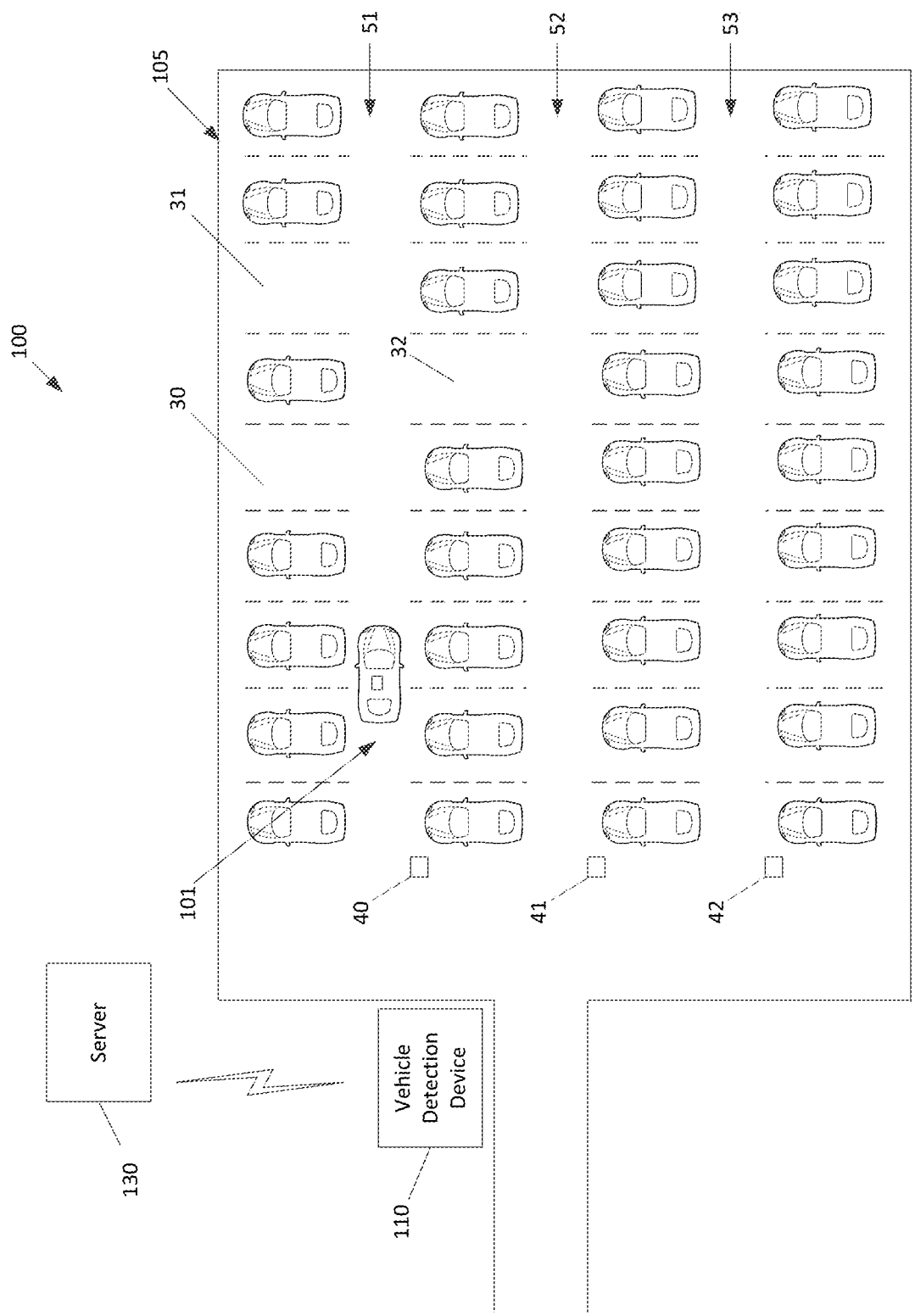

As shown in FIG. 1D, as the vehicle 101 approaches the beacon 41, the beacon 41 and vehicle 101 wirelessly communicate, such as via a bluetooth handshake. As the vehicle 101 proceeds along a proper path toward the row 51, as shown in FIG. 1E, it approaches the beacon 40, and the beacon 40 and the vehicle 101 wirelessly communicate, such as via a bluetooth handshake. By following the expected beacon interactions, the vehicle 101 is led to row 51, and as shown in FIG. 1F, has properly found and turned into row 51. The vehicle 101 will then proceed to autonomously park in one of the available spaces 30-31 in row 51.

Thus, it should be understood that in some applications, the parking instructions sent to the vehicle 101 do not contain a geospatial location off row 51 or spaces 30-31, but rather instruct the vehicle 101 to look for and follow a series of beacon interactions. Thus, after the vehicle receives the parking instructions but before it has selected a direction in which to turn, such as shown in FIG. 1C, the vehicle 101 may actually be in communication with some or all of the beacons 40-42. By measuring absolute signal strength or signal strength in a certain direction, the vehicle 101 may decide in which direction to turn. For example, in FIG. 1C, the parking instructions can inform the vehicle 101 that if it is on the proper path, it will have interactions with beacons 40 and 41. The vehicle 101 may be within communication range of beacons 40-42, and decide to turn left, as in FIG. 1D, due to sensing the signal strength from beacon 40 being stronger to the left.

The parking instructions sent to the vehicle 101 may also include GPS coordinates of the selected row 51 or spaces 30-31, and the vehicle 101 may utilize an internal GPS system coupled with beacon interactions to autonomously drive toward the selected row 51 or spaces 30-31. This may serve more useful in larger parking lots 105, such as those found at stadiums, concert venues, or airports.

The beacons 40-42 report each successful interaction with the vehicle 101 to the parking server 130. Therefore, the parking server 130 can take action of an expected beacon interaction does not take place.

Thus, as the vehicle 101 follows the beacons 40-42 toward the selected row 51, the parking server 130 checks for notification of the expected beacon interactions from the beacons 40-42 (Step 212). If one or more expected beacon interactions does not occur, or if one or more unexpected beacon interactions occur, then the parking server 130 sends remedial parking instructions to the vehicle 101 (Step 213). The remedial parking instructions instruct the vehicle 101 to autonomously drive toward the row 51 or available parking space 30-31 in the row, and may inform the vehicle 101 of new expected beacon interactions, since the proper path toward the row 51 or available parking space 30-31 may be different.

In the case where the new expected beacon interactions do not occur, the parking server 130 may then determine that the vehicle 101 is nonresponsive, for example because it is being manually piloted or is under control of rogue programming. The parking server 130 may then notify a relevant party that the vehicle 101 is nonresponsive to the remedial parking instructions. The relevant party may be an owner of the vehicle 101, owners of other vehicles in the area, other vehicles in the area themselves, a parking lot attendant, the manufacturer of the vehicle 101, or law enforcement, for example. The relevant party may also be the vehicle 101 itself, in the case where the vehicle 101 is being manually piloted. Where the relevant party of the vehicle 101 itself, a warning message may be sent to the vehicle 101, and the vehicle may play or present the warning message to a human in the vehicle 101. The warning message may ask the human to relinquish manual control, for example.

In some cases, the remedial parking instructions may instruct the vehicle 101 to autonomously drive toward a different available parking space, and may inform the vehicle 101 of new expected beacon interactions as it autonomously drives to the different available parking space.

Since the parking server 130 cooperates with the vehicle detection device 110 to keep track of parking space inventory, the parking server 130 continually or periodically checks, as the vehicle 101 autonomously drives toward the row 51 or available parking space 30-31, whether the row or available parking space 30-31 is still available (Step 214). For example, another vehicle, either autonomously driven or driven by a human, may have taken the available parking space or spaces 30-31 before the vehicle 101 reaches the row 51. The beacons 40-42 may cooperate with the parking server 130 so as to provide this monitoring functionality.

Where the row or available parking space 30-31 is no longer available, the parking server 130 sends updated parking instructions to the vehicle 101 (Step 215). The updated parking instructions instruct the vehicle 101 to autonomously drive toward a different available parking space, for example space 32 in row 41, and inform the vehicle 101 of expected beacon interactions as it autonomously drives to this different available parking space.

In still other cases, as the vehicle 101 autonomously drives toward the row 51, a different parking space or row may become newly available, as it was not known as being available at the time at which the vehicle 101 entered the parking lot 105. This different parking space or row may be closer to the vehicle 101 than the row 51. In this case, the parking server 130 may send updated parking instructions to the vehicle 101 instructing it to autonomously drive toward this newly available parking space and informing the vehicle 101 of expected beacon interactions as it autonomously drives to this different available parking space.

The parking server 130 updates the parking inventory (Step 216) when the vehicle 101 parks.

It should be understood that by autonomously driving, it is meant that the vehicle 101 drives with substantially no human interaction, and selects and performs guidance functions such as accelerating, braking, and turning, without human input. This does not mean that a human is not in the vehicle 101, or that a human is not in the driver's seat of the vehicle 101.

In addition, the notification of expected beacon interactions, or of any or all beacon interactions, may be sent by the beacons 40-42 to the parking server 130, and the parking server 130 may relay traffic management commands to the vehicle 101 or other vehicles. These traffic management commands may instruct vehicles when to stop, go, turn, enter parking spaces, or leave parking spaces, to thereby provide for more consistent and rapid traffic flow in the parking lot.

The vehicle 101 and other vehicles may have their own sensors, such as cameras, radar, and GPS systems, and may send data from these sensors to the parking server 130 for use in generating the traffic management commands to any or all vehicles in the parking lot 105.

It should also be appreciated that the above described disclosures, techniques, and methods do not apply solely to the parking lot 105, vehicle detection device 110, parking server 130, and beacons 40-42, but also apply to any and all actions taken by the vehicle 101 or other vehicles in response to communications sent to or received from the vehicle detection device 110, parking server 130, and beacons 40-42.

With additional reference to FIG. 2A, details of the vehicle detection device 110 will now be given. The vehicle detection device 110 includes a processor 111, such as a microprocessor or system on a chip. Coupled to the processor 111 is a magnetometer 112, as well as an accelerometer 113. A Bluetooth module 115 is coupled to the processor 111 for potential communication with the device 102 within the vehicle 101, and a transceiver 114 is coupled to the processor 111 for communication with the parking server 130 over the wide area network, and/or also with other vehicle detection devices 110 if present, and also with the beacon devices sensors 40-42. A display 117, LED 123, and speaker 125 are coupled to the processor 111 for providing visual or audio output to a user. The display 117, LED 123, and speaker 125 may be utilized for any provided output described below instead of the device 102. A camera 121 is coupled to the processor 111 for taking pictures, such as of the license plate of the vehicle 101, which may be sent to and processed by the server. A RFID reader 126 is coupled to the processor 111 for reading RFID tags associated with the vehicle, such as a toll tag mounted in the vehicle, or RFID tags within the tires of the vehicle.

A payment acceptance device 119 is coupled to the processor 111 for accepting payment from a user. The payment acceptance device 119 may utilize magnetic strip, chip and pin, NFC, or other electronic payment acceptance technologies. In addition, the payment acceptance device 119 may also directly accept hard currency, such as bills and coins. It should be appreciated that in some applications, the payment acceptance device 119 may be part of, or may be, the RFID reader 126.

The magnetometer 112 serves to sense metal in vehicles 101 via a change in the local magnetic field, and can thus detect the presence of vehicles 101. The processor 111 may be able to interpret reading from the magnetometer 112 to estimate the dimensions of the vehicle 101, from which a type or configuration of the vehicle may be inferred (i.e. a smaller vehicle estimated to be a car, whereas a larger vehicle is likely to be a truck).

The accelerometer 113 serves to detect vibrations in multiple axes, such as those caused by a passing vehicle 101, and can therefore be used to determine whether the vehicle 101 is entering or leaving the given area. By logging the magnitude and direction of vibrations detected by the accelerometer 113, the processor 111 can infer both the speed of the vehicle, as well as whether the vehicle is arriving or departing.

Due to the use of the accelerometer 113 and magnetometer 112 for detecting vehicles 101, the vehicle detection device 110 is positioned at the entrance and exit to the parking lot 105, and needs not be driven over by the vehicle 101 in order for detection to occur.

As stated, the RFID reader 126 may read RFID tags associated with the vehicle. Thus, the RFID reader 126 may read a code from the RFID tag, and the code may be a toll tag ID number, or may be a tire identification code or any other ID. Where the code is a toll tag ID, the information about the vehicle may be the toll tag ID, which may in turn be used for identification of the user by looking up the user's information in a table of toll tag ID's, or in processing payment via the toll tag ID. Where the code is a tire identification code, the information about the vehicle 101 may be the tire identification code, which may in turn be used by the server to determine a make and model of the tires on the vehicle, which may in turn be used to determine the type of vehicle and vehicle configuration, as well as the make and model of the vehicle. Also, the information about the vehicle may include the various measurements taken by the accelerometer 113 and magnetometer 112 as well as the make and model of the tires, which may be used to more accurately determine the type of vehicle and vehicle configuration, as well as the make and model of the vehicle.

As stated above, using the transceiver 114, the vehicle detection device 110 may communicate with other vehicle detection devices 110. In addition, one vehicle detection device 110 may act as a relay for another vehicle detection device 110, transmitting information received therefrom to the parking server 130, or to the vehicle 101. The transceiver 114 may also be used by the vehicle detection device 110 for communication with a fixed or mobile device used by a parking lot attendant, such as a smartphone, tablet, or pay station.

The processor 111 may also cooperate with additional vehicle detection hardware, such as a pressure sensor or magnetic loop for vehicle sensing, allowing retrofitting of the vehicle detection device 110 to existing parking lot management installations.

The beacons 40-42 are now described in further detail with respect to FIG. 2. The beacons 40-42, each include a processor 61, transceiver 64, RFID module 66, and bluetooth module 65. The structure of the processor 61, transceiver 64, RFID module 66, and bluetooth module 65 is similar to that of the vehicle detection device 110. The processor 61, transceiver 64, and bluetooth module 65 cooperate so as to perform the functions described above in FIGS. 1A-1F.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A vehicle sensing system comprising:
   a vehicle sensing device disposed near an entrance to a given area and configured to detect entry of a vehicle into the given area, and in response, to send to the vehicle an instruction message;
   a plurality of beacon devices disposed somewhere between a location of entry of the vehicle into the given area and an available parking space; and
   a parking server communicating with the vehicle based on the instruction message, and configured to send parking instructions to the vehicle, the parking instructions instructing the vehicle to autonomously drive toward the available parking space, and informing the vehicle of expected interactions with at least a portion of the plurality of beacon devices as it autonomously drives toward the available parking space;
   wherein the at least the portion of the plurality of beacon devices are configured to perform the expected interactions with the vehicle if the vehicle is driving on a proper path toward the available parking space, wherein the proper path includes the vehicle autonomously driving within wireless communication range of the at least the portion of the plurality of beacon devices, wherein reporting the expected interactions is by the at least the portion of the plurality of beacon devices and is to the parking server by the at least the portion of the plurality of beacon devices;
   the expected interactions comprising at least one first two way wireless handshake exchange between a first beacon device and the vehicle, the at least one first two way wireless handshake exchange configured to guide the vehicle from the first beacon toward a second beacon device of the plurality of beacon devices, the second beacon device nearer the available parking space on the proper path than the first beacon device of the plurality of beacon devices; and
   the expected interactions further comprising at least one second two way wireless handshake exchange between the second beacon device and the vehicle after the first two way wireless handshake exchange between the first beacon device and the vehicle, the at least one second two way wireless handshake exchange configured to guide the vehicle from the second beacon device of the plurality of beacon devices toward a further beacon device of the plurality of beacon devices, the further beacon device nearer the available parking space on the proper path than the first beacon device and than the second beacon device,
   wherein the parking server determines that the vehicle is not driving on the proper path as a function of performance of an unexpected interaction between the vehicle and at least one beacon device of the plurality of beacon devices that reports the unexpected interaction to the parking server, the unexpected interaction comprising at least one wireless handshake transmission from the at least one beacon device and reported to the parking server by the at least one beacon device, the at least one beacon device not on the proper path;
   the vehicle sensing device is further configured to determine a size and/or type of the vehicle, and to send the determined size and/or type of the vehicle to the parking server; and wherein the parking server is configured to select the available parking space from among a plurality of available parking spaces as a function of the determined sized and/or type of the vehicle.

2. The vehicle sensing system of claim 1, wherein the parking instructions sent by the parking server instruct the vehicle to autonomously drive to a sub-area including the available parking space.

3. The vehicle sensing system of claim 2, wherein the given area is a parking lot, and wherein the sub-area is a row.

4. The vehicle sensing system of claim 1, wherein the plurality of beacon devices are disposed along a path from the location of entry into the given area toward the available parking space.

5. The vehicle sensing system of claim 4, wherein the given area comprises a parking area including a plurality of sub-areas of parking spaces, one of which includes the available parking space; and wherein at least some of the plurality of beacon devices are positioned at entrances to sub-areas of the plurality of sub-areas of parking spaces.

6. The vehicle sensing system of claim 1, wherein the instruction message from the vehicle sensing device at the entrance to the given area instructs the vehicle to contact the parking server by executing an application programming interface (API) call, wherein the parking server is disposed remotely apart from the vehicle sensing device.

7. The vehicle sensing system of claim 6, wherein the instruction message comprises an API uniform resource locator (URL).

8. The vehicle sensing system of claim 1, wherein the parking server is configured to send updated parking instructions instructing the vehicle to autonomously drive toward a different available parking space, and informing the vehicle of expected interactions with the plurality of beacon device as it autonomously drives to the different available parking space.

9. The vehicle sensing system of claim 8; wherein the different available parking space comprises a newly available parking spot that was not known as being available at a time at which the vehicle entered into the given area.

10. The vehicle sensing system of claim 9, wherein the given area includes a plurality of sub-areas of parking spaces, one of which includes the available parking space; wherein the plurality of beacon devices are disposed along a path from the location of entry into the given area toward the available parking space;
   wherein at least some of the plurality of beacon devices are positioned at entrances to sub-areas of the plurality of sub-areas of parking spaces; wherein at least one of the plurality of beacon devices notifies the parking server that the available parking space is no longer available; wherein at least one of the plurality of beacon devices notifies the parking server that the newly available parking space is newly available.

11. The vehicle sensing system of claim 1, wherein the parking server is further configured to send remedial parking instructions to the vehicle as a function of determination that the vehicle is not driving on the proper path.

12. The vehicle sensing system of claim 11, wherein the parking server is further configured to notify a relevant party as a function of the vehicle not following the remedial parking instructions, the notifying comprising transmitting a warning message to the vehicle.

13. The vehicle sensing system of claim 11, wherein the remedial parking instructions instruct the vehicle to autonomously drive toward the available parking space, and informing the vehicle of new expected interactions with the plurality of beacon devices as it autonomously drives to the available parking space.

14. The vehicle sensing system of claim 11, wherein the remedial parking instructions instruct the vehicle to autonomously drive toward a different available parking space, and informing the vehicle of new expected interactions with the plurality of beacon device as it autonomously drives to the different available parking space.

15. The vehicle sensing system of claim 1, wherein the available parking space comprises at least one available parking space in a sub-area containing the at least one available parking space; wherein the parking instructions instruct the vehicle to autonomously drive toward the sub-area containing the available parking space, and informing the vehicle of expected interactions with the plurality of beacon devices as it autonomously drives toward the sub-area containing the available parking space; and wherein the first beacon device is configured to perform the expected interactions with the vehicle if the vehicle is driving on a proper path toward the sub-area containing available parking space.

16. The vehicle sensing system of claim 1, wherein the parking instructions instruct the vehicle to autonomously drive to and park in the available parking space.

17. The vehicle sensing system of claim 1, wherein the parking server is configured to select the available parking space from among a plurality of available parking spaces as a function of information received from the vehicle.

18. The vehicle sensing system of claim 17, wherein the information received from the vehicle comprises schedule information associated with a user of the vehicle.

19. The vehicle sensing system of claim 18, wherein the schedule information comprises at least one of a destination of the user, a profile of the user, a hotel reservation of the user, an airline ticket of the user, a bus ticket of the user, a cruise ticket of the user, a train ticket of the user, or an event ticket of the user.

20. The vehicle sensing system of claim 17, wherein the information received from the vehicle is user input.

21. The vehicle sensing system of claim 1, wherein the parking server is configured to track inventory of parking spaces.

22. The vehicle sensing system of claim 1, wherein the first beacon device is configured to notify the parking server of performance of at least one expected interaction with the vehicle; and wherein the parking server is configured to send traffic direction commands to a second vehicle as a function of notification of the performance of at least one expected interaction with the vehicle.

23. The vehicle sensing system of claim 1, wherein the parking server is configured to receive telemetry from the vehicle, and to send traffic direction commands to at least one other vehicle as a function of the received telemetry.

24. The vehicle sensing system of claim 1, wherein autonomously driving comprises driving with substantially no driver input, including accelerating, braking, and turning.

25. A method comprising:
    detecting entry of a vehicle into a given area by a vehicle sensing device disposed near an entrance to the given area and in response to the detecting, sending to the vehicle an instruction message;
    communicating, by use of a parking server, with the vehicle based on the instruction message and sending parking instructions to the vehicle, the parking instructions instructing the vehicle to autonomously drive toward an available parking space, and informing the vehicle of expected interactions with a plurality of beacon devices as it autonomously drives toward the available parking space;
    performing the expected interactions with the vehicle by the plurality of beacon devices if the vehicle is driving on a proper path toward the available parking space, wherein the proper path includes the vehicle autonomously driving within wireless communication range of at least a portion of the plurality of beacon devices, wherein reporting the expected interactions is by the at least the portion of the plurality of beacon devices and is to the parking server by the at least the portion of the plurality of beacon devices;
    the expected interactions comprising at least one first two way wireless handshake exchange between a first beacon device and the vehicle, the at least one first two way wireless handshake exchange configured to guide the vehicle from the first beacon toward a second beacon device of the plurality of beacon devices, the second beacon device nearer the available parking space on the proper path than at least one other beacon device of the plurality of beacon devices; and
    the expected interactions further comprising at least one second two way wireless handshake exchange between the second beacon device and the vehicle after the first two way wireless handshake exchange between the first beacon device and the vehicle, the at least one second two way wireless handshake exchange configured to guide the vehicle from the second beacon device of the plurality of beacon devices toward a further beacon device of the plurality of beacon devices, the further beacon device nearer the available parking space on the proper path than the first beacon device and than the second beacon device,
    determining, by the parking server in communication with the vehicle sensing device and the plurality of beacon devices, that the vehicle is not driving on the proper path as a function of performance of an unexpected interaction between the vehicle and at least one beacon device of the plurality of beacon devices that reports the unexpected interaction to the parking server, the unexpected interaction comprising at least one wireless handshake transmission from the at least one beacon device and reported to the parking server by the at least one beacon device, the at least one beacon device not on the proper path;
    determining, by the vehicle sensing device, a size and/or type of the vehicle, and sending the determined size and/or type of the vehicle to the parking server; and selecting, by the parking server, the available parking space from amonq a plurality of available parking spaces as a function of the determined sized and/or type of the vehicle.

26. The method of claim 25, wherein the instruction message instructs the vehicle to contact the parking server by executing an application programming interface (API) call.

27. The method of claim 25, further comprising send updated parking instructions instructing the vehicle to autonomously drive toward a different available parking space, and informing the vehicle of expected interactions with at least one third beacon device as it autonomously drives to the different available parking space.

28. The method of claim 27, wherein the different available parking space comprises a newly available parking space that was not known as being available at a time at which the vehicle entered into the given area.

* * * * *

UNITED STATES PATENT AND TRADEMARK OFFICE
CERTIFICATE OF CORRECTION

Page 1 of 1

PATENT NO. : 10,803,423 B2
APPLICATION NO. : 15/280790
DATED : October 13, 2020
INVENTOR(S) : George Frederick Baker, Sr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 237 days.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*